(12) United States Patent
Sugimoto

(10) Patent No.: US 6,507,451 B1
(45) Date of Patent: Jan. 14, 2003

(54) SEEK CONTROL METHOD AND SYSTEM USING STORED VELOCITY-VS-POSITION DATA

(75) Inventor: Yukimasa Sugimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/330,079

(22) Filed: Jun. 11, 1999

Related U.S. Application Data

(63) Continuation-in-part of application No. 08/851,661, filed on May 6, 1997, now abandoned.

(30) Foreign Application Priority Data

May 9, 1996 (JP) ............................................. 8-115024

(51) Int. Cl.$^7$ ............................................. G11B 5/596
(52) U.S. Cl. ................................................. 360/78.07
(58) Field of Search ........................... 360/77.08, 78.04, 360/78.06, 78.09, 78.07; 369/44.28, 44.34

(56) References Cited

U.S. PATENT DOCUMENTS

| | | | |
|---|---|---|---|
| 5,475,663 A | 12/1995 | Ogino | 369/44.28 |
| 6,243,226 B1 * | 6/2001 | Jeong | 360/78.07 |

FOREIGN PATENT DOCUMENTS

JP　　　　　3-30153　　　2/1991

* cited by examiner

Primary Examiner—David Hudspeth
Assistant Examiner—Mitchell Slavitt
(74) Attorney, Agent, or Firm—Young & Thompson

(57) ABSTRACT

During a sampling interval, a disk-drive seek controller receives a digital sample of actuator drive current and a head-assembly position signal from a drive system and estimates a one-sample future value of remaining seek distance to a target track and a one-sample future value of head-assembly's velocity. Two-sample future values of remaining seek distance and velocity are then estimated from the estimated one-sample future values and a calculated control current. A target velocity value is read from a memory corresponding to the estimated two-sample future remaining seek distance value and a difference between the estimated two-sample future velocity value and the target velocity value is detected. From the difference, an incremental value of control current is determined and summed with a previous value of control current to produce an accumulated control current value. The two-sample future values are repeatedly updated by an iterative calculation process using the accumulated value of control current to decrease the difference. When the difference becomes smaller than a predetermined value, the accumulated control current is supplied as a final value of the sampling interval to the drive system where it is processed and supplied to the actuator during the next sampling interval.

22 Claims, 4 Drawing Sheets

US 6,507,451 B1

SEEK CONTROL METHOD AND SYSTEM USING STORED VELOCITY-VS-POSITION DATA

RELATED APPLICATION

This application is continuation-in-part application of U.S. patent application Ser. No. 08/851,661, filed May 6, 1997, now abandoned.

BACKGROUND OF THE INVENTION

1. Field of the Invention

The present invention generally relates to disk drives, and more specifically to a digital servo-control system for controlling a servo-head of a disk drive during a seek mode.

2. Description of the Related Art

Japanese Laid-Open Patent Specification Hei-3-30153 discloses a digital seek controller, in which target velocity trajectory is stored in a lookup table and a combined feedforward/feedback control scheme is provided for calculating acceleration and deceleration. In the prior art, the difference between a target velocity in the lookup table and an estimated velocity is detected and weighted by a proportional coefficient to produce a control signal, which is then used as a feedback signal to decrease the error between the estimated and reference values.

However, in the digital seek controller where all control data are sampled at clock intervals, off-track position data are obtained at discrete intervals and hence the system's response tends to fluctuate when the head position is approaching a target track (i.e., "seek-settling response"), resulting in a long seek time. This tendency is particularly acute in applications where control data are sampled at relatively long intervals.

In addition, if high speed seek control is desired, rapid acceleration and deceleration of servo-head would be necessary. However, due to the presence of possible variability among head/disc assemblies, errors at the rapid deceleration cannot be sufficiently absorbed by the combined feedforward/feedback approach and the servo-head speed near the target track fluctuates. Hence, settling time is prolonged.

SUMMARY OF THE INVENTION

It is therefore an object of the present invention to provide a seek control method and system that achieve smooth "seek-settling" response.

Another object of the present invention is to ensure robust "seek-settling" response even though the operating characteristics of the servo-head may differ from the standards due to manufacturing tolerances.

According to the present invention, there is provided a method of controlling the velocity of a servo-head on a recording disk during a seek mode, using a memory which defines relationships between a plurality of estimated remaining seek distance values of the servo-head to a target track on the disk and a plurality of corresponding target velocity values, an actuator for moving the servo-head, driving circuitry for processing an input signal to produce an analog drive current and energizing the actuator with the analog drive current, an analog-to-digital (A/D) converter for sampling the analog drive current and producing therefrom a digital sample of drive current during each sampling interval, and a head position detector for producing a head position signal indicating the position of the servo-head. The method comprises the steps of (a) during each sampling interval of the A/D converter, receiving a digital sample therefrom and a head position signal from the head position detector and estimating from the received digital sample and head position signal a one-sample future velocity value and a one-sample future remaining seek distance value, and setting the one-sample future velocity and remaining seek distance values as previous velocity and remaining seek distance values, (b) estimating a two-sample future velocity value and a remaining seek distance value from the previous velocity and remaining seek distance values using a calculated current value, (c) reading a target velocity value from the memory corresponding to the estimated two-sample future remaining seek distance value, (d) detecting a difference between the velocity value of step (b) and the target velocity value of step (c), and (e) deriving an incremental current value from the difference and summing the incremental current value with a previous current value to produce an accumulated current value. During the sampling interval, functions (b) to (e) are repeatedly performed by using the accumulated value of control current as the calculated control current value in order to decrease the difference. When the difference becomes smaller than a predetermined value, the accumulated control current value is supplied as a final value of the given sampling interval to the driving circuitry where it is processed and supplied to the actuator during the next sampling interval.

BRIEF DESCRIPTION OF THE DRAWINGS

The present invention will be described in further detail with reference to the accompanying drawings, in which.

DETAILED DESCRIPTION

Figure 1:
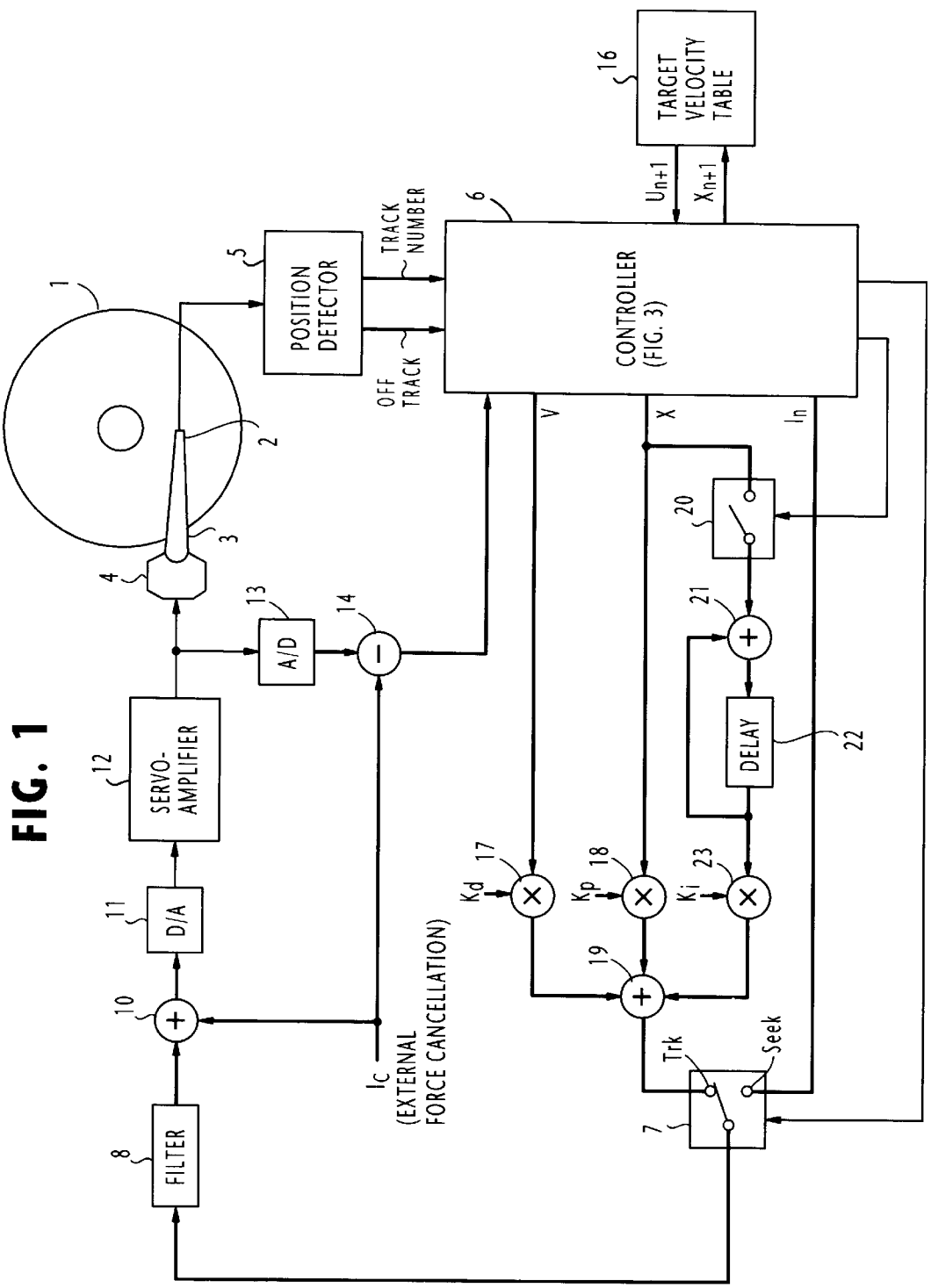
FIG. 1 is a block diagram of a disk drive control circuit according to the present invention.

Referring to FIG. 1, there is shown a servo-control system of the present invention for a magnetic (hard) disk drive. The disk drive includes a plurality of vertically spaced-apart disks. The description is based on a typical disk drive in which position signals are recorded on all the surface of one of the disks to be exclusively used for servo-control purposes. Such a servo-control disk is shown at 1 in FIG. 1. The head assembly for the servo-control disk 1 includes a servo-head 2 mounted at the end of an access arm 3 which is driven by a voice-coil motor, or actuator 4 which is energized by an analog drive current supplied from a servo-amplifier 12. The output of servo-amplifier 12 is also fed to an A/D converter 13 to produce a digital sample of the drive current.

Signals recorded on disk 1 are detected by the servo-head and applied to a head position detector 5 where they are amplified and processed to produce track number data indicating the number of tracks traversed by the servo-head and off-track position data indicating the off-center distance of the servo-head to the center of a nearest track. These data are supplied on a per-sample basis to a controller 6, along with the digital sample of the analog drive current from the A/D converter 13 via a subtractor 14.

Figure 2:
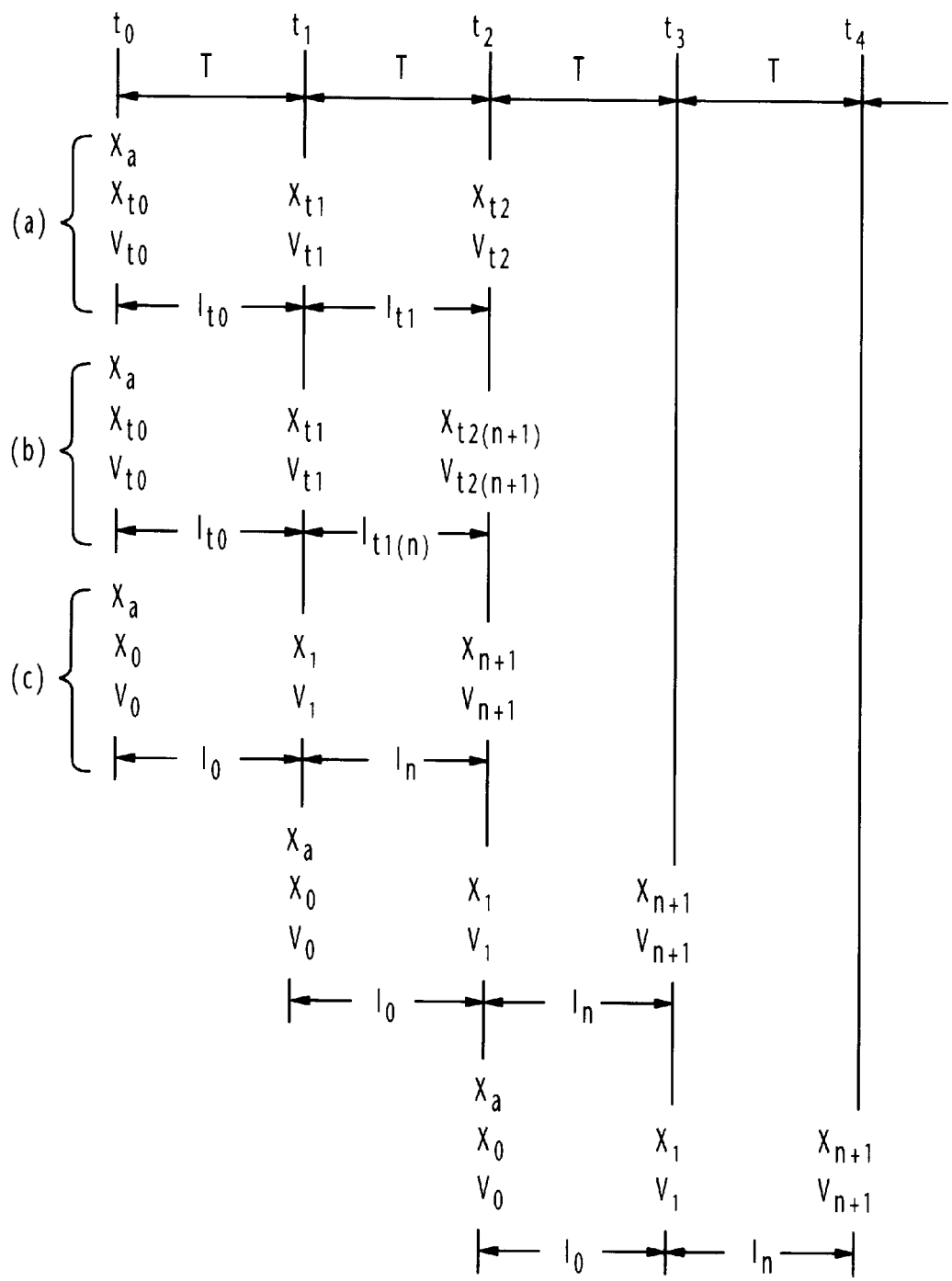
FIG. 2 is a diagram for explaining the estimation process of the present invention along with the relationships between various notations used in the specification.

As shown in part (a) of FIG. 2, the operation of the controller 6 is a process of estimation repeatedly performed at sampling intervals. At time $t_0$, an estimation process is initiated in response to a timer-interrupt signal for estimating a one-sample future (=$t_1$) remaining seek distance value $X_{t_1}$ and a one-sample future velocity value $V_{t_1}$ from a detected remaining seek distance $X_a$ at $t_0$, a control current value $I_{t_0}$ which is used to energize the actuator during sampling interval $t_0$–$t_1$, previous seek distance value $X_{t_0}$ and previous velocity value $Vt_{t_0}$. As shown in part (b) of FIG. 2, a two-sample future (=$t_2$) remaining seek distance value $X_{t_2}$ (n+1) and two-sample future velocity values $V_{t_2}$(n+1) are subsequently repeatedly estimated in an iterative calculation (simulation) process within the sampling interval $t_0$–$t_1$, using the one-sample future distance and velocity values $X_{t_1}$ and $V_{t_1}$, to calculate a control current value $I_{t_1}$(n) which will be used by the actuator during sampling interval $t_1$–$t_2$.

The above notations of the control current 1, the remaining s seek distance X and the velocity V are changed as follows for purposes of convenience (see also part (c) of FIG. 2):

$I_{t_0}$ (control current calculated for interval $t_0$–$t_1$)=$I_0$ $I_{t_1}$(n) (control current calculated for interval $t_1$–$t_2$)=$I_n$ $X_{t_0}$ (previous seek distance)=$X_0$ $V_{t_0}$ (previous velocity)=$V_0$ $X_{t_1}$ (distance estimated at $t_0$ for $t_1$)=$X_1$ $V_{t_1}$ (velocity estimated at $t_0$ for $t_1$)=$V_1$ $X_{t_2}$(n+1) (distance estimated at to for $t_2$)=$X_{n+1}$ $V_{t_2}$(n+1) (velocity estimated at to for $t_2$)=$V_{n+1}$ The above estimation process is successively repeated at sampling intervals T so that subsequent two-sample future estimations for $t_3$ and $t_4$ are performed at $t_1$ and $t_2$, respectively.

During each iterative calculation process, the controller 6 looks up a target velocity table 16. In this table, remaining seek distance values X (i.e., the distance to a target position) are mapped to corresponding target velocity values U which define a reference trajectory. Using the distance value $X_{n+1}$ as an address pointer, the controller reads a target velocity value $U_{n+1}$ and detects the difference between $V_{n+1}$ and $U_{n+1}$. From this difference, an incremental seek current value $\Delta I_{n+1}$ is derived and summed with a previous seek current value to produce an accumulated current. When the difference between $V_{n+1}$ and $U_{n+1}$ becomes smaller than a predetermined value or the number of iterative calculations becomes greater than a predetermined value, whichever is earlier, the accumulated current that is obtained at this moment is delivered from the controller as a final value of seek control current $I_n$ of the iterative calculations via a mode-select switch 7 to a digital loop filter 8.

During the seek control mode, the mode-select switch 7 is switched to the lower position for directly coupling the current control signal $I_n$ to the digital loop filter 8 to filter out the high frequency components of the seek control current. The filtered seek control signal is applied to an adder 10. In order to compensate for an external force exerted on the access arm 3, a compensating current value $I_c$ is supplied to the adder 10 where it is combined with the output of the filter 8. The output of adder 10 is converted to analog form by a D/A converter 11 and fed to the servo-amplifier 12. The net current value of the amplifier 12 is detected by the A/D converter 13 and sampled at intervals T and converted to digital samples. The digital samples of the drive current are fed to the subtractor 14 where the external force canceling $I_c$ is removed from the detected net current value.

The actuator 4 of the head assembly can be modeled as a second-order integrator. If the controller 6 takes one sampling interval $t_0$–$t_1$ to complete an estimation on input data obtained at time $t_0$, the one-sample future remaining seek distance value $X_1$ and the one-sample future velocity value $V_1$ are given by the following equations which are known in the feedback control theory as the "state observer":

$$X_1 = X_0 - V_0 \cdot T + (G \cdot T^2/2)I_0 + K_{f1}(X_a - X_0) \quad (1)$$

$$V_1 = V_0 - G \cdot T \cdot I_0 - K_{f2}(X_a - X_0) \quad (2)$$

where,

G=acceleration constant of the actuator 4, and $K_{f1}$, $K_{f2}$=feedback constants used to prevent divergence of estimated values.

It will be seen that the fourth term of equation (1) and the third term of equation (2) are the feedback terms derived from the error between $X_a$ and $X_0$.

With the one-sample future values $X_1$ and $V_1$ obtained by the equations (1) and (2), controller 6 repeatedly solves the following equations by successively incrementing iteration variable "n" and using a control current value $I_n$:

$$X_{n+1} = X_1 - V_1 \cdot T + (G \cdot T^2/2)I_n \quad (3)$$

$$V_{n+1} = V_1 - G \cdot T \cdot I_n \quad (4)$$

Figure 3:
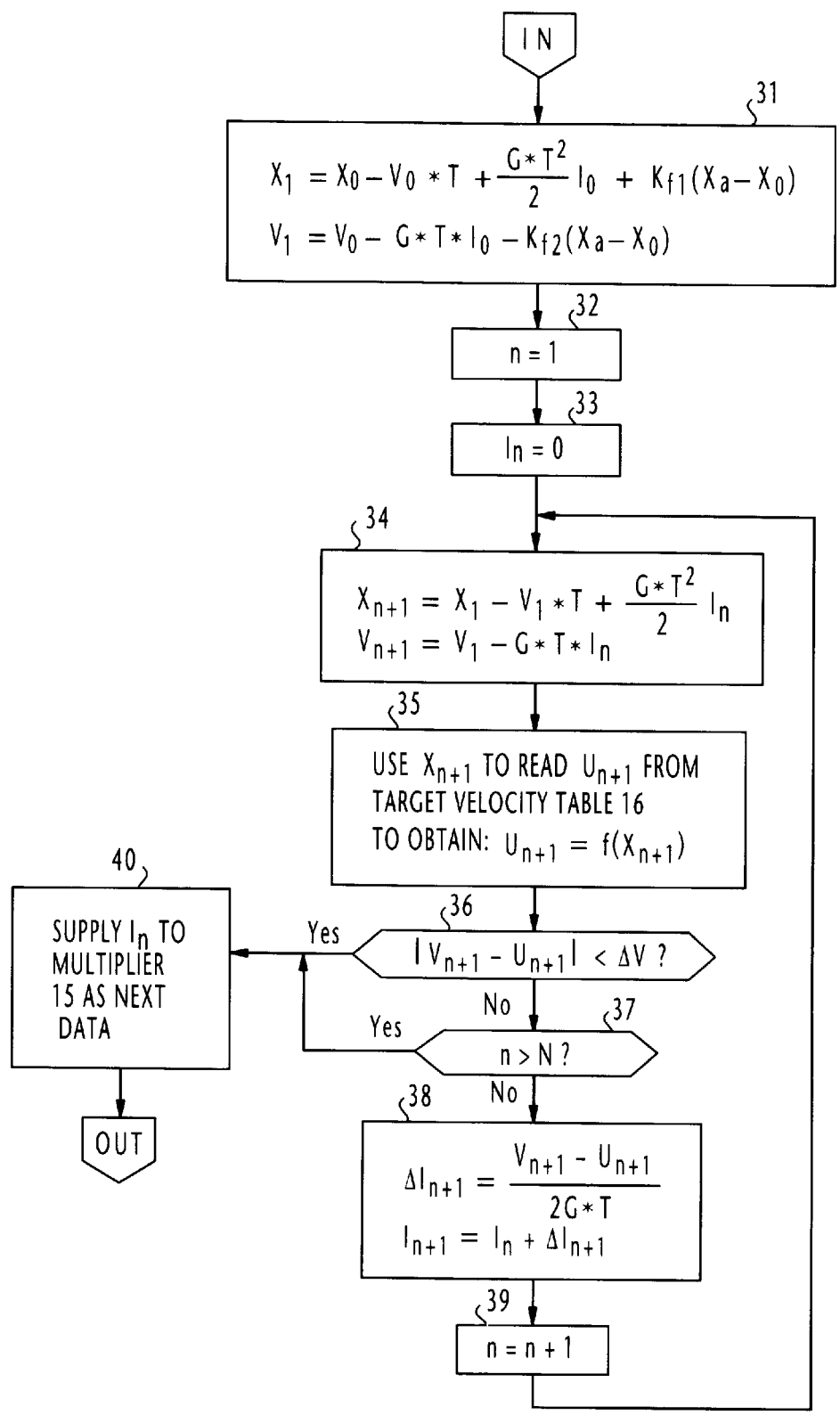
FIG. 3 is a flowchart of the clock-synchronous operation of the controller of FIG. 1 during the seek mode.

FIG. 3 illustrates a flowchart according to which the controller 6 performs a timer-interrupt routine during a seek mode. In response to a sampling clock pulse, the controller 6 starts executing the timer-interrupt routine.

At step 31, the controller 6 solves equations (1) and (2) to produce one-sample future distance value $X_1$ and velocity value $V_1$. An iterative-calculation variable n is set equal to 1 (step 32) and the seek control current $I_n$ is set equal to a predetermined initial value which is preferably zero (step 33). At step 34, equations (3) and (4) are calculated to produce a two-sample future distance value $X_{n+1}$ and a two-sample future velocity value $V_{n+1}$. At step 35, controller 6 uses the $X_{n+1}$ value to read corresponding target velocity data from table 16 to obtain a target velocity value $U_{n+1}$=f($X_{n+1}$).

At step 36, controller 6 determines whether the absolute value $|V_{n+1} - U_{n+1}|$ becomes smaller than a predetermined value $\Delta V$. If not, flow proceeds from step 36 to step 37 to check to see if n is greater than a predetermined number N. If the decision is negative at step 37, flow proceeds to step 38 to determine the seek control current $I_n$ by solving the following equations (5) and (6):

$$\Delta I_{n+1} = (V_{n+1} - U_{n+1})/(2G \cdot T) \quad (5)$$

$$I_{n+1} = I_n + \Delta I_{n+1} = I_n + (V_{n+1} - U_{n+1})/(2G \cdot T) \quad (6)$$

At step 39, the variable n is incremented by 1 and flow returns to step 34 to repeat the above process.

As steps 34 to 38 are repeatedly executed, the absolute velocity difference $V_{n+1} - U_{n+1}$ successively decreases. When the decision at step 36 or 37 becomes affirmative, flow proceeds to step 40 to supply the current value $I_n$ to the switch 7 so that an analog current value $I_n$ is fed from the D/A converter 11 to the servo-amplifier 12 at the beginning of the next sampling interval.

More specifically, when n=1, the control current value $I_n$ is set equal to zero. With $I_n$=0, a two-sample future distance $X_2$ equals $X_1 - V_1 \times T$ and a two-sample future velocity $V_2$ equals $V_1$. Then, the controller 6 looks up the target velocity table 16 to search for a target velocity value $U_2$ on a velocity trajectory curve corresponding to $X_2$ and obtains $U_2=f(X_2)$. An incremental current value $\Delta I_2$ is then determined by equation (5). If this increment current value $\Delta I_2$ were applied to the actuator 4, the head velocity would vary by an amount corresponding to $(V_1-U_1)/2$. This incremental current value is summed with a current value $I_1$. Since $I_1$ is 0, a current value $I_2=(V_2-U_2)/(2G \cdot T)$ is obtained for n=1.

Therefore, when n=2, if the seek control current value $I_2$ were used to energize the actuator, two-sample future values $X_3$ and $V_3$ would be obtained from equations (3) and (4) as follows:

$$X_3 = X_1 - V_1 \cdot T + (G \cdot T^2/2)I_2$$

$$V_3 = V_1 - G \cdot T \cdot I_2$$

By repeating the above process when n=3, the following results will be obtained:

$$I_3 = I_2 + \Delta I_3$$

$$\Delta I_3 = (V_3 - U_3)/(2G \cdot T)$$

$$X_4 = X_1 - V_1 \cdot T + (G \cdot T^2/2)I_3$$

$$V_4 = V_3 - G \cdot T \cdot I_3$$

Figure 4:
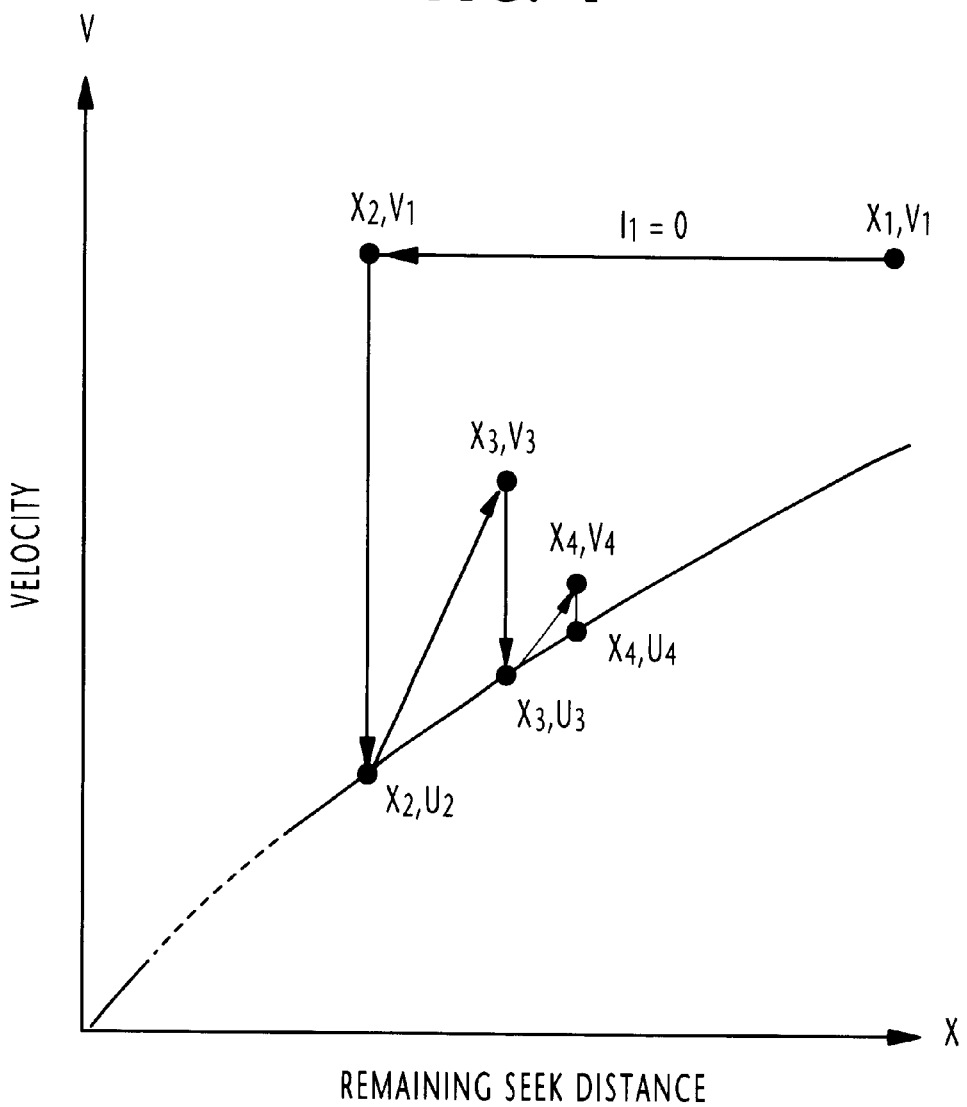
FIG. 4 is a graphic illustration of the operation of the controller in a partially enlarged scale when the head position is controlled in the neighborhood of a target track during a seek mode.

As the above iterative calculations proceed, the head velocity approaches the velocity curve defined in the target velocity table 16 as shown graphically in FIG. 4, and the absolute value of the difference between $V_{n+1}$ and $U_{n+1}$ decreases. At the instant the difference between $V_{n+1}$ and $U_{n+1}$ becomes smaller than the threshold value $\Delta V$ or at the instant the variable n becomes greater than the predetermined value N, the controller 6 determines that the servo-head will attain the target velocity if the actuator 4 were supplied with a final value of the calculated seek control current obtained at that instant and exits step 36 or 37 and enters step 40. Thus, controller 6 supplies this final current value to the filter 8 via the lower position of switch 7.

The clock-synchronous routine of FIG. 3 is repeatedly executed until the track number indicated by the head position detector 5 equals the track number specified by an input command signal and the servo-head is settled on the target track.

Since the estimated seek control current is used only when the estimated velocity is at or near a target value on the target velocity curve (FIG. 4) and the timer-interrupt routine is repeatedly executed until the servo-head settles on the target track, the seek control currents successively supplied to the actuator 4 vary smoothly and the servo-head follows the target velocity curve. As a result, the seek controller of this invention has a robust seek settling response that can absorb possible parasitic elements of head assemblies due to manufacturing tolerances.

When the servo-head is settled on the target track, the controller 6 moves the switch 7 to the upper position to enter a tracking mode in which it uses the off-track position data from head position detector 5 as well as the output of subtractor 14 to control the head position so that it follows the center of the target track. During the tracking mode, controller 6 estimates the position X and the velocity V of servo-head for the next sampling instant by solving equations (1) and (2). The velocity signal V is applied to a multiplier 17 where it is weighted by a derivative coefficient $K_d$ and the position signal X is weighted by a proportional coefficient $K_p$. The outputs of multipliers 17 and 18 are summed by an adder 19 and the combined signal is supplied through the upper position of switch 7 to the filter 8 as a PD (proportional/derivative) control. If PID (proportional/integral/derivative) control is provided, the position signal X is further supplied through a switch 20 to an integrator formed by an adder 21 and a delay unit 22 which feeds its output back to the adder 21. The integrated position signal X is weighted by an integral coefficient $K_i$ and combined with the PD control signal by the adder 19.

What is claimed is:

1. A method of controlling the velocity of a servo-head on a recording disk during a seek mode, using a memory which defines relationships between a plurality of estimated remaining seek distance values of said servo-head to a target track on said disk and a plurality of corresponding target velocity values, an actuator for moving said servo-head, driving circuitry for processing an input signal to produce an analog drive current and energizing said actuator with said analog drive current, an analog-to-digital (A/D) converter for sampling said analog drive current and producing therefrom a digital sample of drive current during each sampling interval, and a head position detector for producing a head position signal indicating the position of said servo-head, the method comprising the steps of:

a) during each sampling interval of the A/D converter, receiving a digital drive current sample therefrom and a head position signal from the head position detector and estimating from the received digital sample and head position signal a one-sample future velocity value and a one-sample future remaining seek distance value, and setting said one-sample future velocity and remaining seek distance values as previous velocity and remaining seek distance values;

b) estimating a two-sample future velocity value and a two-sample future remaining seek distance value from the previous velocity and remaining seek distance values using a calculated drive current value;

c) reading a target velocity value from said memory corresponding to the estimated two-sample future remaining seek distance value;

d) detecting a difference between the estimated two-sample future velocity value of step (b) and the target velocity value of step (c);

e) deriving an incremental drive current value from said difference and summing the incremental drive current value with a previous current value to produce an accumulated drive current value; and f) repeating steps (b) to (e) to decrease said difference by using the accumulated drive current value of step (e) as said estimated drive current value when performing step (b) and supplying a final value of the accumulated drive current value to said driving circuitry.

2. The method of claim 1, wherein steps (b) to (e) are repeated until said difference becomes smaller than a threshold value to produce said final value.

3. The method of claim 1, wherein steps (b) to (e) are repeated a predetermined number of times if said difference does not become smaller than a threshold value to produce said final value.

4. The method of claim 1, wherein steps (a) to (f) are repeated until said servo-head is settled on said target track.

5. The method of claim 1, wherein the incremental current value is proportional to ½ of said difference.

6. A method of controlling the velocity of a servo-head on a recording disk during a seek mode, using a memory which defines relationships between a plurality of estimated remaining seek distance values of said servo-head to a target track on said disk and a plurality of corresponding target velocity values, an actuator for moving said servo-head, driving circuitry for processing an input signal to produce an analog drive current and energizing said actuator with said analog drive current, an analog-to-digital (A/D) converter for sampling said analog drive current and producing therefrom a digital sample of drive current during each sampling interval, and a head position detector for producing a head position signal indicating the position of said servo-head, the method comprising the steps of:

a) during each sampling interval of the A/D converter, receiving a digital sample therefrom and a head position signal from the head position detector and estimating from the received digital sample and head position signal a one-sample future velocity value $V_1$ and a one-sample future remaining seek distance value $X_1$, and setting a variable n to 1;

b) solving the following equations to estimate a two-sample future remaining seek distance value $X_{n+1}$ and a two-sample future velocity value $V_{n+1}$, by using a calculated value of control current, where $I_n$ is equal to a predetermined initial value when n is 1;

$$X_{n+1} = X_1 - V_1 \times T + I_n(G \times T^2)/2$$

$$V_{n+1} = V_1 - G \times T \times I_n$$

where,
G=acceleration constant of said actuator, and
T=interval between samples, c) reading a target velocity value $U_{n+1}$ from said memory corresponding to the estimated remaining seek distance value $X_{n+1}$;

d) detecting a difference $|V_{n+1} - U_{n+1}|$;

e) calculating an accumulated current value $I_{n+1} = I_n + (V_{n+1} - U_{n+1})/(2G \times T)$; and f) incrementing n by 1, repeating steps (b) to (e) to decrease said difference by using the accumulated current value of step (e) as said calculated value of control current when solving said equations, and supplying a final value of the accumulated current value to said driving circuitry.

7. The method of claim 6, wherein said predetermined initial value is zero.

8. The method of claim 6, wherein steps (b) to (e) are repeated until said difference becomes smaller than a threshold value.

9. The method of claim 6, wherein steps (b) to (e) are repeated a predetermined number of times if said difference does not become smaller than a threshold value.

10. The method of claim 6, wherein steps (a) to (f) are repeated until said servo-head is settled on said target track.

11. The method of claim 6, wherein the incremental current value is proportional to ½ of said difference.

12. A control system for a servo-head driven by an actuator on a recording disk, comprising:

driving circuitry for processing an input signal to produce an analog drive current and energizing said actuator with said analog drive current;

an analog-to-digital (A/D) converter for periodically sampling said analog drive current and producing therefrom a digital sample during each sampling interval;

a head position detector connected to said servo-head;

a memory for defining relationships between a plurality of estimated remaining seek distance values of said servo-head to a target track on said disk and a plurality of target velocity values; and a controller for performing, during each sampling interval of said A/D converter, the functions of:

a) receiving a digital sample of drive current from said A/D converter and a position signal from said head position detector and estimating from the received digital sample and position signal a one-sample future velocity value and a one-sample future remaining seek distance value, and setting the estimated velocity and remaining seek distance values as previous velocity and remaining seek distance values;

b) estimating a two-sample future velocity value and a two-sample future remaining seek distance value from the previous velocity and remaining seek distance values using a calculated value of drive current;

c) reading a target velocity value from said memory corresponding to the estimated two-sample future remaining seek distance value;

d) detecting a difference between the estimated two-sample future velocity value and the target velocity value;

e) deriving an incremental value of drive current from said difference and summing the incremental value with a previous calculated value of drive current to produce an accumulated value of drive current; and f) repeatedly performing the functions (b) to (e) by using the accumulated value of drive current as said calculated value of drive current to decrease said difference and supplying a final value of the accumulated value to said driving circuitry.

13. The control system of claim 12, wherein the controller repeatedly performs the functions (b) to (e) until said difference becomes smaller than a threshold value.

14. The control system of claim 12, wherein the controller repeatedly performs the functions (b) to (e) a predetermined number of times if said difference does not become smaller than a threshold value during said sampling interval.

15. The control system of claim 12, wherein the controller repeatedly performs the functions (a) to (f) until said servo-head is settled on said target track.

16. The control system of claim 12, wherein said incremental current value is proportional to ½ of said difference.

17. A control system for a servo-head driven by an actuator on a recording disk, comprising:

driving circuitry for processing an input signal to produce an analog drive current and energizing said actuator with said analog drive current;

an analog-to-digital (A/D) converter for periodically sampling said analog drive current and producing therefrom a digital sample during each sampling interval;

a head position detector connected to said servo-head;

a memory for defining relationships between a plurality of estimated remaining seek distance values of said servo-head to a target track on said disk and a plurality of target velocity values; and a controller for performing, during each sampling interval of the A/D converter, the functions of:

a) receiving a digital sample from said A/D converter and a position signal from said head position detector and estimating from the received digital sample and position signal a one-sample future velocity value $V_1$ and a one-sample future remaining seek distance value $X_1$;, and setting a variable n to 1;

b) solving the following equations to estimate a two-sample future remaining seek distance value $X_{n+1}$ and a two-sample future velocity value $V_{n+1}$ by using a calculated control current value $I_n$, wherein $I_n$ is equal to a predetermined initial value when n is 1;

$$X_{n+1} = X_1 - V_1 \times T + I_n(G \times T^2)/2$$

$$V_{n+1} = V_1 - G \times T \times I_n$$

where,
G = acceleration constant of the actuator,
T = interval between said digital samples, and c) reading a target velocity value $U_{n+1}$ from said memory corresponding to the estimated remaining seek distance value $X_{n+1}$;

d) detecting a difference $|V_{n+1} - U_{n+1}|$;

e) determining an accumulated value $I_{n+1}$ of the control current, where $I_{n+1} = I_n + (V_{n+1} - U_{n+1})/(2G \times T)$; and f) incrementing n by 1, repeatedly performing the functions (b) to (e) to decrease said difference by using the accumulated value of step (e) as said calculated control current value when solving said equations and supplying a final accumulated value of the control current to said driving circuitry as said input signal.

18. The control system of claim 17, wherein said predetermined initial value is zero.

19. The control system of claim 17, wherein the controller repeatedly performs the functions (b) to (e) until said difference becomes smaller than a threshold value.

20. The control system of claim 17, wherein the controller repeatedly performs the functions (b) to (e) a predetermined number of times when said difference does not become smaller than a threshold value during said sampling interval.

21. The control system of claim 17, wherein steps (a) to (f) are repeated until said servo-head is settled on said target track.

22. The control system of claim 17, wherein said incremental current value is proportional to ½ of said difference.

* * * * *